Sept. 3, 1957 T. A. MILLER ET AL 2,804,643
VACUUM EXTRACTOR APPARATUS FOR REMOVING HOLLOW FLEXIBLE
MOLDED ARTICLES FROM REENTRANT MOLD CAVITIES
Filed March 21, 1955 2 Sheets-Sheet 1

INVENTORS
THEODORE A. MILLER
& THEODORE A. MILLER JR.
BY Oldham &
Oldham
ATTORNEYS

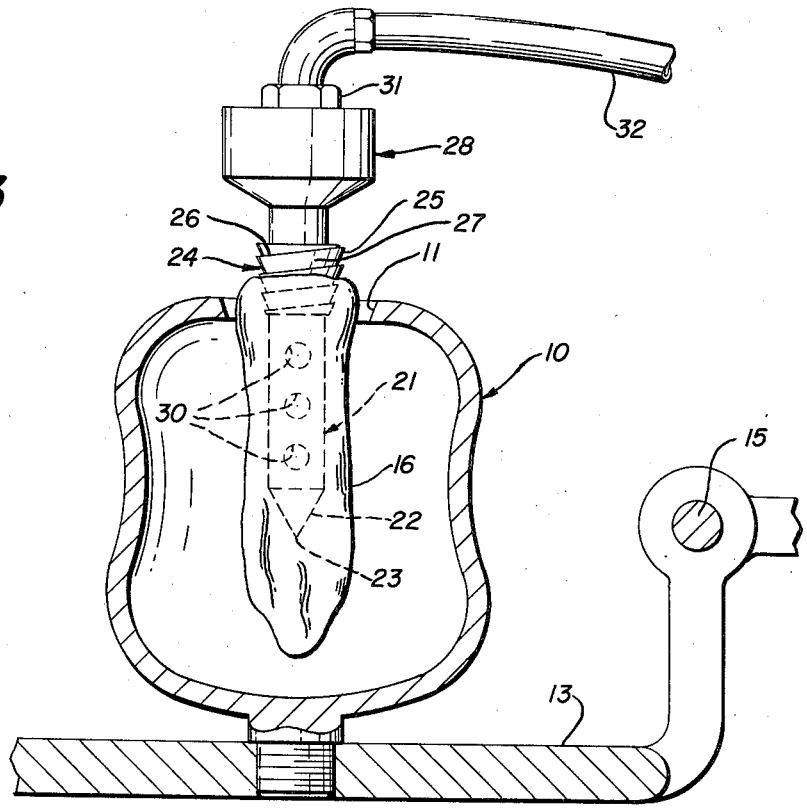

United States Patent Office 2,804,643
Patented Sept. 3, 1957

2,804,643

VACUUM EXTRACTOR APPARATUS FOR REMOVING HOLLOW FLEXIBLE MOLDED ARTICLES FROM REENTRANT MOLD CAVITIES

Theodore A. Miller and Theodore A. Miller, Jr., Cuyahoga Falls, Ohio

Application March 21, 1955, Serial No. 495,414

3 Claims. (Cl. 18—2)

This invention relates to an apparatus for removing flexible hollow molded articles by use of vacuum from reentrant mold cavities in which they have been formed, and is especially useful in removing hollow articles formed in such molds by deposit from plastisol or a dispersion of thermo-setting plastic, although the invention may be used for removing hollow rubber or other hollow flexible articles.

In the manufacture of hollow articles of thermo-setting plastic material, such as doll heads, it is desirable to form the articles within a mold having a continuous surface, free from seams, which would leave mold markings on the portions of the article exposed during use. Such articles may be formed by deposit from a dispersion of thermo-setting plastic within a closed mold and the mold may be provided with a closeable opening at the neck, in the case of a doll head, or at some other portion not exposed in use of the article, through which the liquid material may be inserted. During depositing of the plastic on the interior walls of the mold, the opening may be closed by a plug which, when removed, permits withdrawal of the article. Due to the reentrant character of the mold cavity, considerable difficulty has been experienced in withdrawing the molded article through the opening.

It is an object of the present invention to overcome the foregoing and other difficulties.

It is another object of the invention to provide an extracting mechanism which will enter and seal an opening in the molded article and will then collapse the article to permit its removal from a mold opening.

These and other objects will appear from the following description, reference being had to the accompanying drawings.

Of the drawings:

Fig. 3 is a view similar to Fig. 2 but showing the article collapsed by differential pressure.

Figure 1:
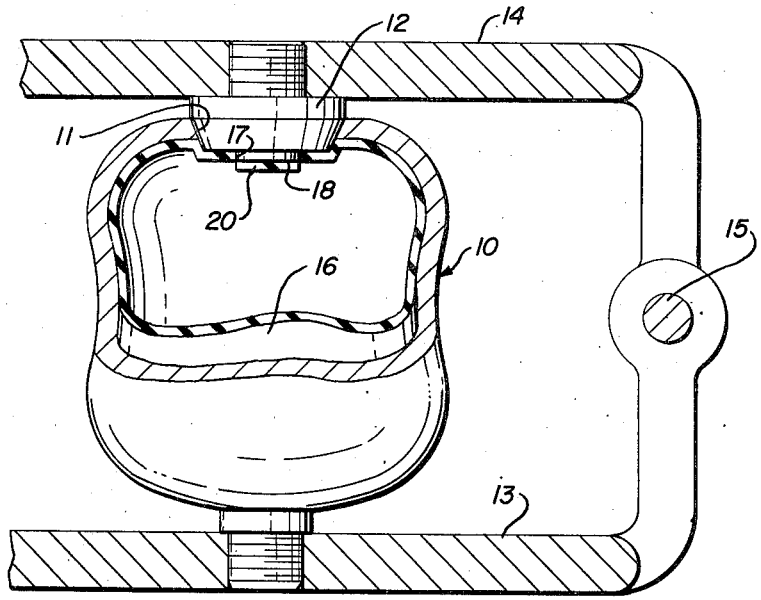
Fig. 1 is a side view of a mold with a flexible hollow article therein, the mold and article being shown as partly broken away and partly in cross-section.
Figure 2:
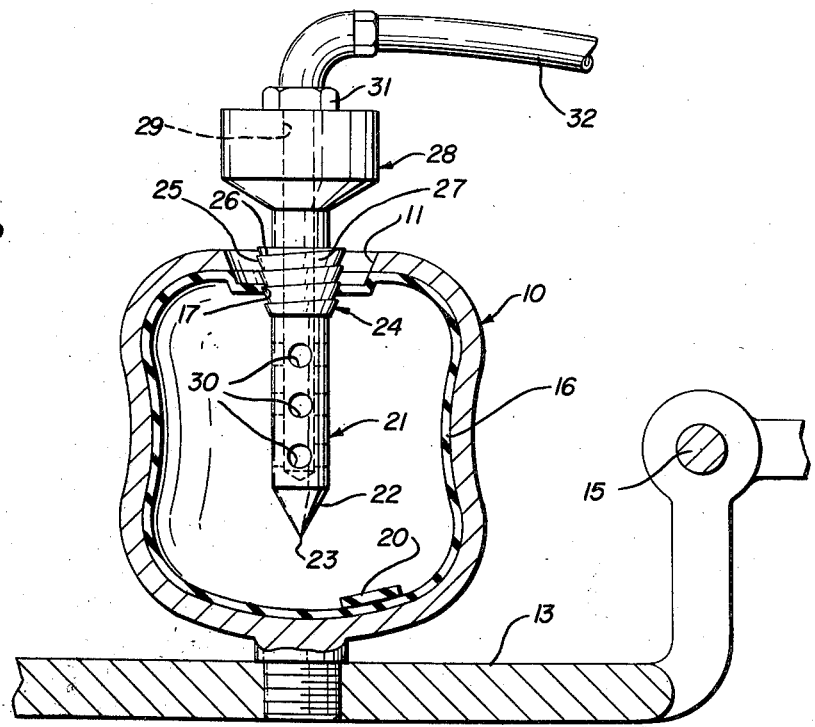
Fig. 2 is a sectional view of the lower or cavity portion of the mold with the plug or upper portion removed and the tool of the invention inserted in the article.

Referring to the drawings, the numeral 10 designates a hollow reentrant mold cavity having an opening 11 adapted to be closed by a removable plug 12. The mold and plug are, for convenience in handling, mounted on a pair of parallel mold plates 13, 14 respectively, hinged to each other as at 15. The opening 11 in the mold cavity is of conical or tapered form and the plug 12 is correspondingly tapered. In use with the plug removed, a pre-measured quantity of the plastisol or liquid is placed in the cavity through the opening 11 and the plug 12 is inserted in the opening. The mold is then rotated and simultaneously rocked while heat is applied to the mold to gell and thermo-set the plastic material as a coating over the mold surfaces providing the closed hollow article 16 therein.

For assisting in removing the article 16 from the mold, an opening 17 therethrough, smaller than but in alignment with the opening 11 of the mold cavity, is then provided in any desired manner. A convenient manner of forming this opening is provided by forming a depending annular skirt 18 of thin metal on the plug 12, the skirt being of length at least equal to the wall thickness of the article and terminating in a razor-sharp lower edge. With such an arrangement, a button 20 of material is formed substantially separated from the remainder of the deposit and readily punched therefrom after opening of the mold.

For removing the article from the mold cavity, a tubular finger 21 is provided having a conical closed anterior end 22 terminating in a sharp point 23. The finger is substantially equal in diameter to the opening 17 of the article. Spaced from its conical anterior end, it is provided with a conical collar 24 of enlarged size which is formed with a buttress thread 25 of coarse pitch, the thread progressively increasing in diameter away from the point 23 with its abrupt flank 26 facing away from said point and its more sloping flank 27 toward the point. The arrangement is such that the thread 25 at the smaller end of the collar is slightly larger than the body of the finger 21. Spaced from the collar 24 more remote from the point 23 is an enlarged head 28 whereby the finger may be held and rotated either by hand or by power-operated means (not shown). A duct 29 extends axially of the finger 21 from side openings 30 thereof through the head 28 when it is connected by a swivel union 31 to a flexible conduit 32 which may be connected to a vacuum line by a suitable control valve (not shown) whereby air may be withdrawn or permitted to escape through the side openings.

The operation of the apparatus is as follows: The finger 21 is inserted in the opening 17 of the article and is rotated to screw the thread 25 into the opening which is stretched thereby so as to hold the finger against withdrawal by engagement of the abrupt flank of the thread with the interior face of the article. This seals the opening in the article which is then exhausted through the side openings 30, duct 29, and conduit 32 and collapses as shown in Fig. 3 to a dimension which will pass the opening 11. The article may then be withdrawn, air is admitted to the article through the finger 21 and the finger is removed by rotating it in the opposite direction.

As the entire article is reduced to a size to pass the opening 11, it may be removed without contacting the mold opening with the possibility of injury to its surface substantially eliminated. The apparatus is fast in operation, and accomplishes its purpose without contacting the mold surface.

Variations may be made without departing from the scope of the invention, as it is defined by the following claims.

We claim:

1. Apparatus for removing a flexible hollow article having a small opening in its wall from a reentrant mold cavity in which it has been formed, said apparatus comprising a finger insertable through the opening in the article, means integral with the finger for sealing the finger to the material about the opening of the article, said means comprising a threaded enlargement of said finger for engaging and stretching the material about the opening into threaded sealed engagement with the finger, a passage through said finger communicating with the interior of the article for escape of air therefrom, and suction means connected to said passage to withdraw such air and collapse the article.

2. Apparatus for removing a flexible hollow article having a small opening in its wall from a reentrant mold cavity in which it has been formed, said apparatus comprising a finger insertable through the opening in the article, means integral with the finger for sealing the finger to the material about the opening of the article, said means comprising a threaded enlargement of said finger progressively increasing in diameter for engaging and stretching the material about the opening into threaded sealed engagement with the finger, said thread being of buttress form with its abrupt flank facing away from the anterior end of the finger for abutment with the inner face of the article, a passage through said finger communicating with the interior of the article for escape of air therethrough and a vacuum line connected to said passage to withdraw such air and collapse the article.

3. Apparatus for removing a flexible hollow article having a small opening in its wall from a reentrant mold cavity in which it has been formed, said apparatus comprising a finger insertable through the opening in the article, means fixed to said finger for sealing the finger to the material about the opening of the article, said means comprising an enlargement of said finger spaced from its anterior end and having a thread of progessively increasing diameter for engaging and stretching the material of the article about its opening by threaded engagement therewith, and means including a passage communicating with a side opening of said finger and a suction line connected thereto for vacuum exhausting air from the article to reduce its size.

References Cited in the file of this patent

UNITED STATES PATENTS

| | | |
|---|---|---|
| 180,229 | Harcum | July 25, 1876 |
| 1,624,704 | Adams | Apr. 12, 1927 |
| 1,745,827 | Ashton | Feb. 4, 1930 |
| 1,809,260 | Wilson | June 9, 1931 |
| 1,924,530 | Woock | Aug. 29, 1933 |
| 2,100,627 | Bucy et al. | Nov. 30, 1937 |
| 2,375,148 | Terry | May 1, 1945 |
| 2,735,137 | Miller et al. | Feb. 21, 1956 |

FOREIGN PATENTS

| | | |
|---|---|---|
| 65,491 | Sweden | Aug. 22, 1913 |